US007145446B2

(12) United States Patent
Katou

(10) Patent No.: US 7,145,446 B2
(45) Date of Patent: Dec. 5, 2006

(54) TRANSPONDER FOR TIRE CONDITION MONITORING APPARATUS

(75) Inventor: Michiya Katou, Ogaki (JP)

(73) Assignee: Pacific Industrial Co., Ltd., Gifu-Ken (JP)

( * ) Notice: Subject to any disclaimer, the term of this patent is extended or adjusted under 35 U.S.C. 154(b) by 25 days.

(21) Appl. No.: 10/713,526

(22) Filed: Nov. 12, 2003

(65) Prior Publication Data

US 2004/0113764 A1    Jun. 17, 2004

(30) Foreign Application Priority Data

Dec. 9, 2002    (JP) ............................. 2002-357003

(51) Int. Cl.
B60C 23/00    (2006.01)

(52) U.S. Cl. ..................... 340/448; 340/442; 73/146; 343/742

(58) Field of Classification Search ............... 340/447, 340/448; 73/146.8, 146.5, 146; 318/16, 318/727; 343/787, 788, 742, 867, 834
See application file for complete search history.

(56) References Cited

U.S. PATENT DOCUMENTS

| 4,048,614 | A | | 9/1977 | Shumway |
| 4,609,905 | A | * | 9/1986 | Uzzo ........................... 340/447 |
| 4,724,427 | A | * | 2/1988 | Carroll .................... 340/572.1 |
| 5,040,561 | A | | 8/1991 | Achterholt |
| 5,181,975 | A | * | 1/1993 | Pollack et al. ............ 152/152.1 |
| 5,540,092 | A | * | 7/1996 | Handfield et al. ......... 73/146.5 |
| 5,731,516 | A | | 3/1998 | Handfield et al. |
| 5,774,048 | A | | 6/1998 | Achterholt |
| 5,853,020 | A | | 12/1998 | Widner |
| 5,977,870 | A | * | 11/1999 | Rensel et al. ................ 340/447 |
| 5,987,980 | A | | 11/1999 | Mangafas et al. |
| 6,204,758 | B1 | * | 3/2001 | Wacker et al. .............. 340/444 |
| 6,710,708 | B1 | * | 3/2004 | McClelland et al. ........ 340/442 |
| 6,829,926 | B1 | * | 12/2004 | Cantu et al. ................ 73/146.4 |
| 2003/0179151 | A1 | * | 9/2003 | Senba et al. ................ 343/895 |

FOREIGN PATENT DOCUMENTS

| JP | 5-169931 A | 7/1993 |
| WO | WO 02/20287 A1 | 3/2002 |

* cited by examiner

Primary Examiner—Daniel Wu
Assistant Examiner—Travis Hunnings
(74) Attorney, Agent, or Firm—Crompton, Seager & Tufte, LLC

(57) ABSTRACT

A transponder for a tire condition monitoring apparatus is provided. The transponder detects a condition of a tire and wirelessly transmits data representing the detected condition in response to radio waves having a field intensity equal to or greater than a predetermined level. The transponder is provided in a tire valve.

9 Claims, 4 Drawing Sheets

TRANSPONDER FOR TIRE CONDITION MONITORING APPARATUS

BACKGROUND OF THE INVENTION

The present invention relates to a transponder for a tire condition monitoring apparatus that wirelessly transmits data representing the condition of a tire in response to radio waves having a field intensity equal to or greater than a predetermined level.

For example, Japanese Laid-Open Patent Publication No. 5-169931 discloses a tire having a transponder. The transponder has a coil antenna for wirelessly transmitting the condition of the tire attached to a vehicle. When an interrogating electromagnetic field is generated outside the transponder, electricity is induced by the coil antenna. Based on the induced electricity, the transponder wirelessly transmits data representing, for example, identification of the tire.

However, since the transponder of the publication is accommodated in a tire, the transponder is changed when the tire is replaced by a new tire.

Further, since the new tire must have the same type of transponder, the choices of tire are limited. Also, to process the removed tire, the accommodated transponder must be removed, which creates an additional work. That is, the transponder cannot be separated from the tire main body. This adds to inconvenience when replacing and scrapping the tire.

SUMMARY OF THE INVENTION

Accordingly, it is an objective of the present invention to provide a transponder for tire condition monitoring apparatus, which transponder can be separated from a tire main body.

To achieve the foregoing and other objectives and in accordance with the purpose of the present invention, a transponder for a tire condition monitoring apparatus is provided. The tire condition monitoring apparatus detects condition of a tire and wirelessly transmits data representing the detected condition in response to radio waves having a field intensity equal to or greater than a predetermined level. The transponder is provided in a tire valve.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to one embodiment will now be described with reference to the drawings. The apparatus 1 is used in a vehicle such as an automobile.

Figure 1:
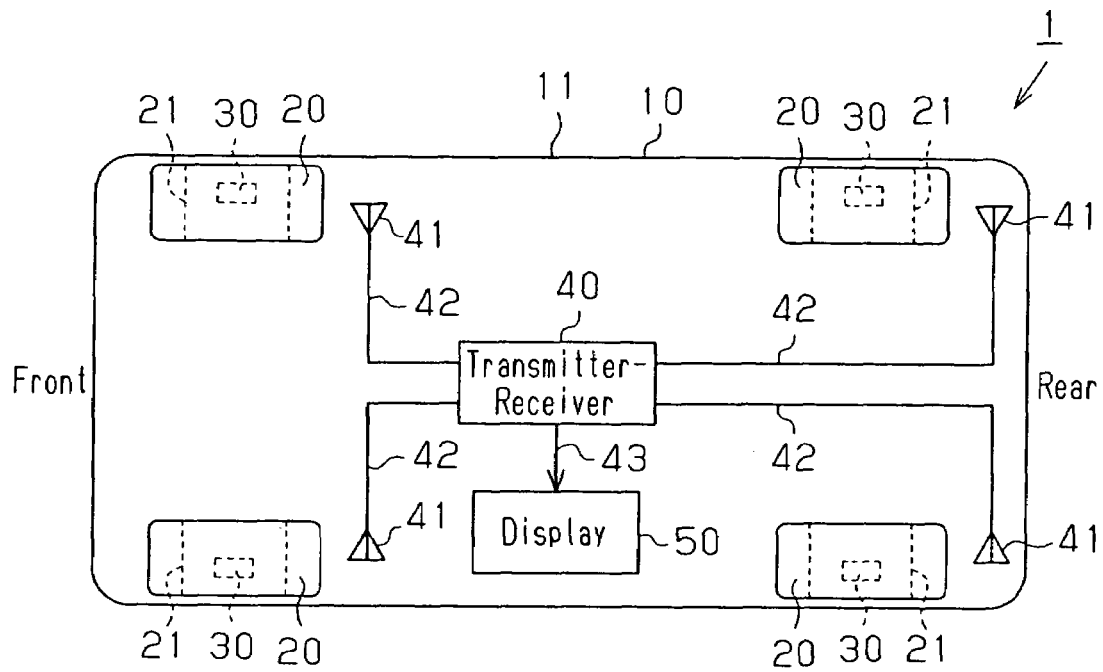
FIG. 1 is a diagrammatic view illustrating a tire condition monitoring apparatus.

As shown in FIG. 1, the tire condition monitoring apparatus 1 includes four transponders 30 and a transmitter-receiver 40. Each transponder 30 is located in one of the tires 20 of a vehicle 10. The transmitter-receiver 40 is located on a body frame 11 of the vehicle 10.

Each transponder 30 is located in the corresponding tire 20 and is fixed, for example, to a wheel 21 of the tire 20. Each transponder 30 measures the condition of the corresponding tire 20, that is, the pressure of the tire 20. The transponder 30 then wirelessly transmits data containing air pressure data.

The transmitter-receiver 40 is located at a predetermined position on the body frame 11 and is activated by electricity of a battery (not shown) of the vehicle 10. The transmitter-receiver 40 has four antennas 41, each of which corresponds to different one of the transponders 30. Each antenna 41 is connected to the transmitter-receiver 40 with a cable 42. The transmitter-receiver 40 transmits radio waves having a field intensity equal to or greater than a predetermined level at a predetermined timing. Based on the radio waves, each transponder 30 induces electricity for wirelessly transmitting data containing pressure data. The transmitter-receiver 40 receives data transmitted by each transponder 30 chiefly through the corresponding antenna 41.

A display 50 is located in the view of the driver of the vehicle 10, for example, in the passenger compartment. The display 50 is connected to the transmitter-receiver 40 with a cable 43.

Figure 2:
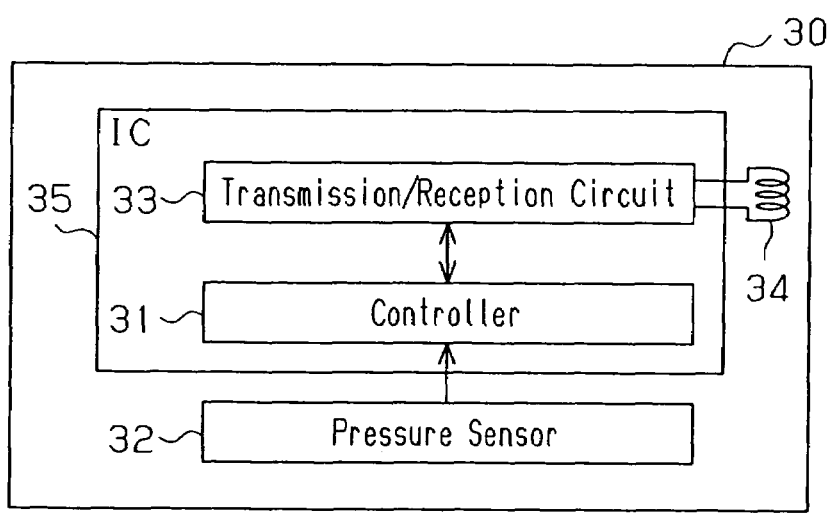
FIG. 2 is a block diagram showing a transponder of the tire condition monitoring apparatus of FIG. 1.

As shown in FIG. 2, each transponder 30 includes a controller 31, which is a microcomputer. The controller 31 includes, for example, a central processing unit (CPU), a read only memory (ROM), and a random access memory (RAM). A unique ID code is registered in an internal memory, for example, the ROM, of the controller 31. The ID code is used to distinguish the associated transponder 30 from the other three transponders 30.

Each pressure sensor 32 measures the air pressure in the interior of the associated tire 20 and provides the controller 31 with pressure data, which is obtained from the measurement. Each pressure sensor 32 functions as condition detecting means. Each controller 31 sends data containing the air pressure data and the registered ID code to a transmission-reception circuit 33. The transmission-reception circuit 33 encodes and modulates the data sent from the controller 31. The transmission-reception circuit 33 then wirelessly sends the data through the coil antenna 34.

The coil antenna 34 induces electricity in response to radio waves having a field intensity equal to or greater than a predetermined level. For example, in response to radio waves transmitted by the corresponding antenna 41, the coil antenna 34 induces electricity. The transmission-reception circuit 33 supplies the induced electricity to the controller 31. The controller 31 controls the transponder 30 with the supplied electricity. In other words, the transponder 30 is activated with the electricity induced by the coil antenna 34. The controller 31 and the transmission-reception circuit 33 are integrated on a single IC 35.

Figure 3:
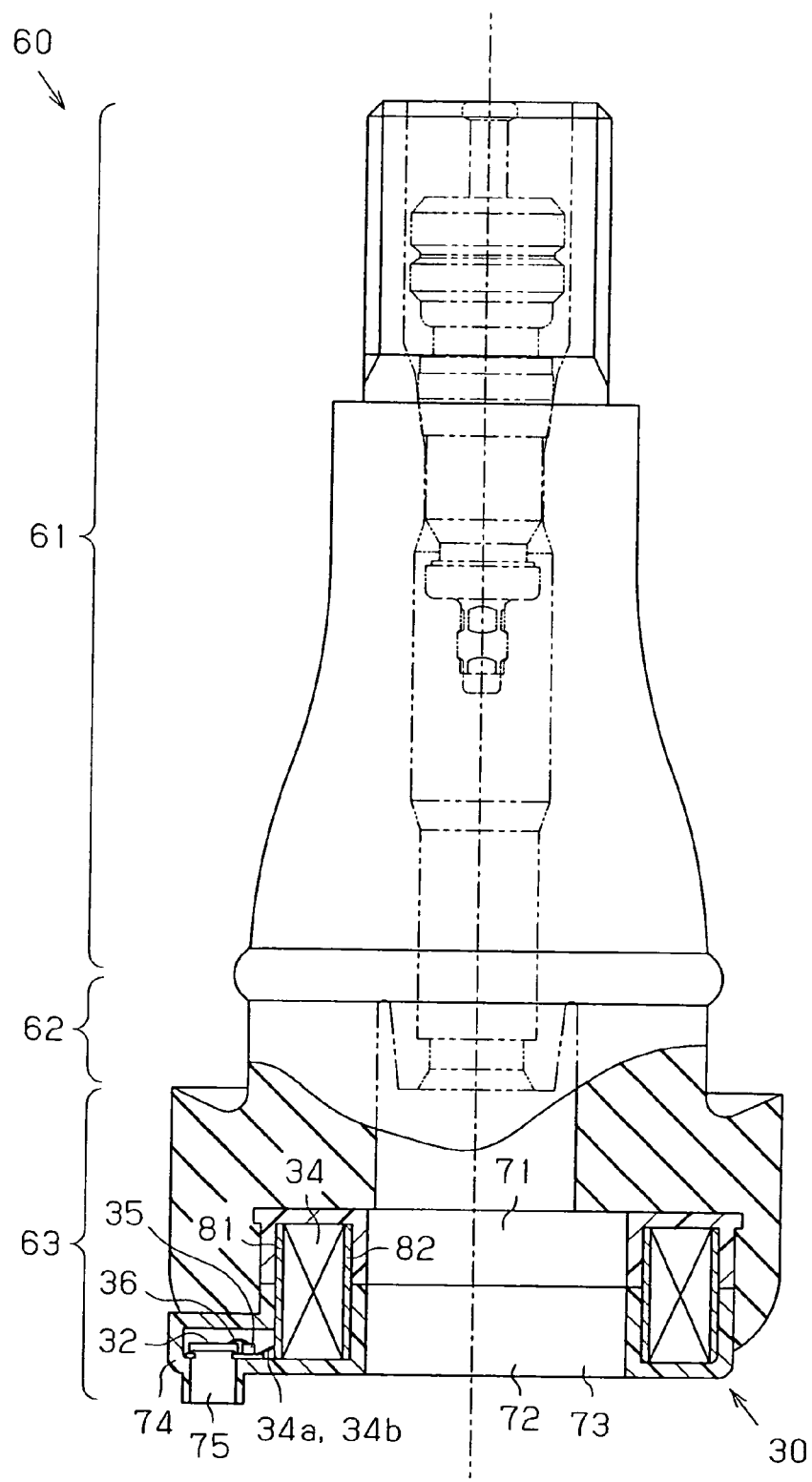
FIG. 3 is a partially cross-sectional view showing the tire valve of the tire condition monitoring apparatus of FIG. 1.
Figure 4:
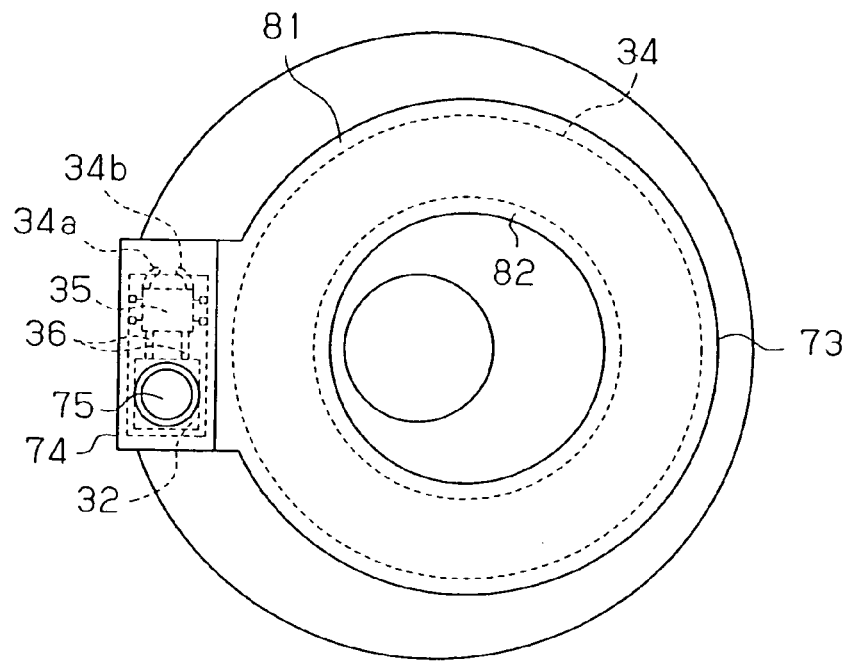
FIG. 4 is a bottom view showing the tire valve of FIG. 3.

As shown in FIGS. 3 and 4, a tire valve 60 includes an upper portion 61 protruding outward from the wheel 21, an engage portion 62 engaged with a valve hole of the wheel 21, and a lower portion 63 embedded in the tire 20. The tire valve 60 is a "snap-in valve (covered with rubber)".

The transponder 30 is located at the lower portion 63 of the tire valve 60. That is, the transponder 30 is accommodated in substantially annular upper and lower cases 71, 72 in the lower portion 63 of the tire valve 60. Specifically, the cases 71, 72 include an annular portion 73 accommodating the annular coil antenna 34, and a projection portion 74 accommodating the IC 35 and the pressure sensor 32.

Annular magnetic plates 81, 82 are provided on the outer circumference and the inner circumference of the coil antenna 34, respectively. The magnetic plates 81, 82 permit the coil antenna 34 to generate a high voltage. The magnetic plates 81, 82 also permit the directivity of the coil antenna 34 to be controlled.

A hole 75 is formed in the projection portion 74 of the lower case 72. The pressure sensor 32 is provided in a portion of the projection portion 74 that corresponds to the hole 75. The pressure sensor 32 measures the air pressure in the tire 20 through the hole 75.

The pressure sensor 32 is connected to the IC 35 with a lead wire 36. The IC 35 is connected to the coil antenna 34 with the coil terminals 34a, 34b of the coil antenna 34.

Figure 5:
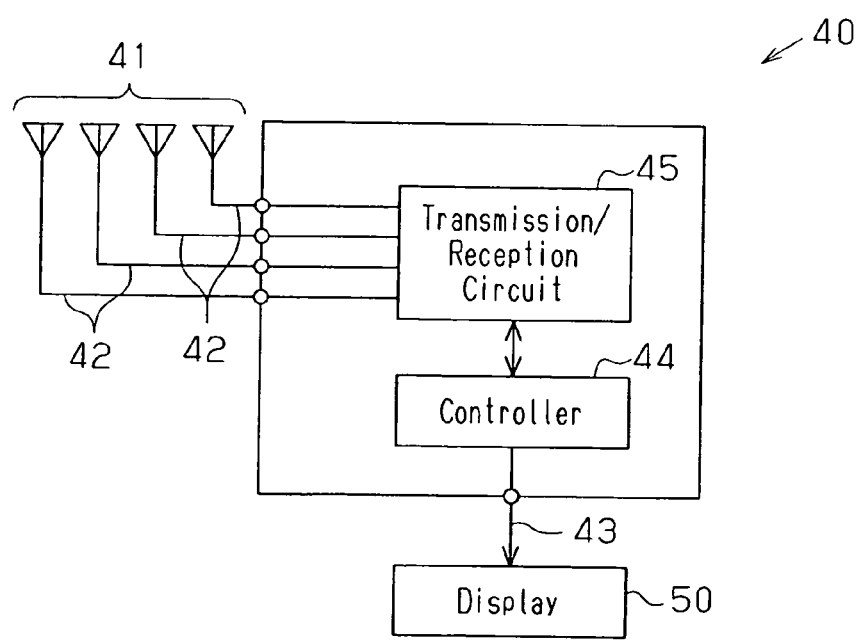
FIG. 5 is a block diagram showing a transmitter-receiver of the tire condition monitoring apparatus of FIG. 1.

As shown in FIG. 5, the transmitter-receiver 40 includes a controller 44 and a transmission-reception circuit 45. The transmission-reception circuit 45 processes data received with the antennas 41. The controller 44, which is, for example, a microcomputer, includes a CPU, a ROM, and a RAM. The transmission-reception circuit 45 receives data transmitted by each transponder 30 chiefly through the corresponding antenna 41. The transmission-reception circuit 45 demodulates and decodes the received data and sends the data to the controller 44.

Based on the received data, the controller 44 obtains the internal pressure of the tire 20 that is associated with the transponder 30 that is the source of the received data. The controller 44 also causes the display 50 to show data regarding the air pressure. Particularly, when there is an abnormality in the pressure of the tire 20, the reception controller 44 displays warning on the display 50.

The controller 44 causes the antennas 41 to transmit radio waves having a field intensity equal to or greater than a predetermined level at a predetermined timing. Based on the radio waves, the coil antenna 34 of each transponder 30 induces electricity. The transponder 30 uses the electricity to wirelessly transmit data containing the air pressure data. The transmitter-receiver 40 receives data transmitted by each transponder 30 chiefly through the corresponding antenna 41.

An operation of the tire condition monitoring apparatus 1 configured as above will now be described.

When the transmitter-receiver 40 outputs radio waves having a field intensity equal to or greater than a predetermined level from each antenna 41 at a predetermined timing, the coil antenna 34 of the transponder 30 that corresponds to the antenna 41 induces electricity. The induced electricity permits the transponder 30 to measure the air pressure in the tire 20 with the pressure sensor 32. The transponder 30 wirelessly transmits data containing the data of the measured air pressure with the coil antenna 34. The transmitter-receiver 40 receives data wirelessly transmitted by the transponder 30 through the corresponding reception antenna 41. Based on the received data, the transmitter-receiver 40 obtains the air pressure of the tire 20 that is associated with the transponder 30 that is the source of the received data. The transmitter-receiver 40 also causes the display 50 to show data regarding the air pressure.

This embodiment has the following advantages.

(1) Each transponder 30 is located at the lower portion 63 of the corresponding tire valve 60 that is fixed to the wheel 21. Therefore, when the tire is replaced by a new tire, the wheel 21 continues to be used. Thus, the transponder 30 is not replaced. Also, since the transponder 30 is located in the tire valve 60, the selection of the tire 20 is not limited. When removing the old tire 20, it is sufficient to remove the old tire 20 from the wheel 21 as in the conventional procedure. That is, providing the transponder 30 in the tire valve 60 does not add to any additional works.

(2) Each transponder 30 is located at the lower portion 63 of the corresponding tire valve 60 that is embedded in the tire 20. Therefore, the appearance of the wheel 21 is not impaired.

(3) The annular magnetic plates 81, 82 are provided on the outer circumference and the inner circumference of each annular coil antenna 34, respectively. The magnetic plates 81, 82 permit the coil antenna 34 to generate a high voltage. The magnetic plates 81, 82 also permit the directivity of the coil antenna 34 to be controlled. Therefore, the coil antenna 34 is less susceptible to influences of external radio waves, and permits reliable communication between the transponder 30 and the transmitter-receiver 40.

(4) Based on radio waves transmitted by the transmitter-receiver 40, each transponder 30 wirelessly transmits data containing air pressure data of the associated tire 20 through the coil antenna 34. Therefore, the timing at which the transponder 30 performs wireless transmission can be controlled by the transmitter-receiver 40. Therefore, the transmitter-receiver 40 is capable of causing each transponder 30 to transmit data containing the air pressure data of the corresponding tire 20 at an arbitrary timing.

It should be apparent to those skilled in the art that the present invention may be embodied in many other specific forms without departing from the spirit or scope of the invention. Particularly, it should be understood that the invention may be embodied in the following forms.

Figure 6:
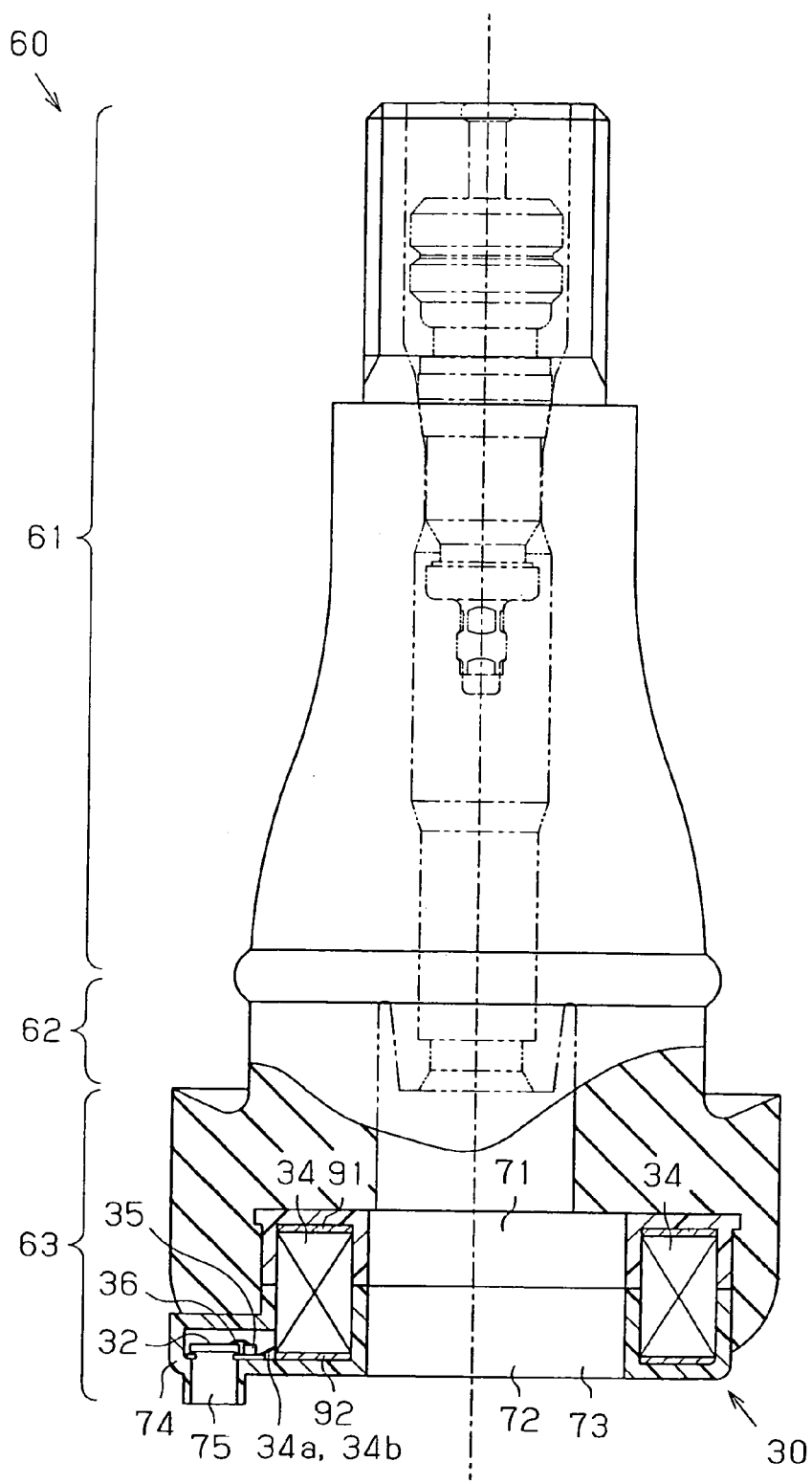
FIG. 6 is a partially cross-sectional view showing a tire valve according to another embodiment.

As shown in FIG. 6, annular magnetic plates 91, 92 may be provided on the axial end faces of each coil antenna 34. The magnetic plates 91, 92 have substantially the same outer diameter as the coil antenna 34. That is, the magnetic plates 91, 92 may be provided between the upper case 71 and the upper side of the coil antenna 34, and between the lower case 72 and the lower side of the coil antenna 34, respectively. The magnetic plates 91, 92 permit the coil antenna 34 to generate a high voltage. The magnetic plates 91, 92 also permit the directivity of the coil antenna 34 to be controlled.

The annular magnetic plates 81, 82 may be omitted from each coil antenna 34. In this case, each coil antenna 34 is a nondirectional antenna.

The shape of each coil antenna 34 may be changed. For example, each coil antenna 34 may be shaped as an ellipse or a polygon.

In addition to the pressure sensor 32, each transponder 30 may have another condition detection means such as a temperature sensor for measuring the temperature in the tire 20. In this case, the transponder 30 wirelessly transmits the temperature data in the tire 20.

Air pressure data transmitted by each transponder 30 may indicate the value of the air pressure or whether the air pressure is within a permissible range.

Other than four-wheeled vehicles, the present invention may be applied to two-wheeled vehicles, such as bicycles and motor cycles, multi-wheeled busses, multi-wheeled towed vehicles and industrial vehicles, such as forklifts. When the present invention is applied to a towed vehicle, the transmitter-receiver 40 and the display 50 are provided in the tractor.

When the snap-in valve (covered with rubber) is manufactured, the cases 71, 72, which are located in the lower portion 63 of the tire valve 60, may be adhered to each other through vulcanization.

During vulcanization, a space for the transponder 30 may be created in the lower portion 63 of the tire valve 60, and, thereafter, the cases 71, 72 may be provided in the created space.

Therefore, the present examples and embodiments are to be considered as illustrative and not restrictive and the invention is not to be limited to the details given herein, but may be modified within the scope and equivalence of the appended claims.

The invention claimed is:

1. A transponder for a tire condition monitoring apparatus that detects condition of a tire and wirelessly transmits data representing the detected condition in response to radio waves having a field intensity equal to or greater than a predetermined level:
wherein the transponder is provided in a tire valve attached to a wheel upon which the tire is mounted, such that the transponder is embedded in the tire;
wherein the transponder includes:
a condition detecting device for detecting a condition of the tire;
a coil antenna, which is induced by radio waves having a field intensity equal to or greater than a predetermined level to generate electricity; and
an annular casing mounted on the tire valve, the annular casing comprising an upper casing portion and a lower casing portion that are connected with each other along a plane intersecting an axis of the casing, the annular casing having an accommodating portion that accommodates the coil antenna and a projecting portion projecting into the tire from the accommodating portion, the projecting portion accommodating the condition detecting device, wherein the accommodating portion is formed at an upper periphery of the casing to extend across the upper casing portion and the lower casing portion, and wherein the projecting portion projects from the lower casing portion;
wherein, based on the electricity induced by the coil antenna, the transponder detects condition of the tire with the condition detecting device and wirelessly transmits data representing the detected condition.

2. The transponder of a tire condition monitoring apparatus according to claim 1, further comprising:
a pair of annular magnetic plates, wherein the magnetic plates are each provided on one of an outer circumference and an inner circumference of the coil antenna, respectively.

3. The transponder of a tire condition monitoring apparatus according to claim 1, further comprising:
a pair of annular magnetic plates, wherein the magnetic plates are each provided on one of axial end faces of the coil antenna, respectively.

4. The tire condition monitoring apparatus according to claim 1, wherein the condition detecting device is a pressure sensor, and wherein the projecting portion has a hole through which the pressure sensor measures air pressure in the tire.

5. The tire condition monitoring apparatus according to claim 4, wherein the projecting portion extends parallel to an axis of the coil antenna.

6. An apparatus for monitoring condition of tires of a vehicle, the apparatus comprising:
a transmitter-receiver that transmits radio waves having a field intensity equal to or greater than a predetermined level at a predetermined timing; and
transponders, wherein each transponder is provided in a tire valve attached to a wheel upon which one of the tires is mounted;
wherein each transponder includes:
a pressure sensor for measuring the air pressure of the corresponding tire;
a coil antenna, wherein, when receiving the radio waves, the coil antenna induces electricity for activating the pressure sensor, and transmits the air pressure data measured by the pressure sensor; and
an annular casing mounted on the tire valve, the annular casing comprising an upper casing portion and a lower casing portion that are connected with each other along a plane intersecting an axis of the casing, the annular casing having an accommodating portion that accommodates the coil antenna and a projecting portion projecting into the tire from the accommodating portion, the projecting portion accommodating the condition detecting device, wherein the accommodating portion is formed at an upper periphery of the casing to extend across the upper casing portion and the lower casing portion, and wherein the projecting portion projects from the lower casing portion;
wherein, based on the electricity induced by the coil antenna, the transponder detects condition of the tire with the condition detecting device and wirelessly transmits data representing the detected condition.

7. The tire condition monitoring apparatus according to claim 6, wherein a pair of annular magnetic plates are provided for each transponder, wherein the magnetic plates of each transponder are each provided on one of an outer circumference and an inner circumference of the corresponding coil antenna, respectively.

8. The tire condition monitoring apparatus according to claim 6, wherein a pair of annular magnetic plates are provided for each transponder, wherein the magnetic plates of each transponder are each provided on one of axial end faces of the corresponding coil antenna, respectively.

9. The tire condition monitoring apparatus according to claim 6, wherein the projecting portion has a hole through which the pressure sensor measures the air pressure in the tire.

* * * * *